Patented Nov. 4, 1952

2,616,877

UNITED STATES PATENT OFFICE 2,616,877

PROCESS FOR AMINATING HALO-METHYLATED COPOLYMERS

Elmer L. McMaster, Midland, Mich., assignor to The Dow Chemical Company, Midland, Mich., a corporation of Delaware No Drawing. Application April 6, 1950, Serial No. 154,452

8 Claims. (Cl. 260—88.1)

This invention concerns the production of synthetic ion exchange agents of high anion exchange capacity in the form of stable beads, spheres, spheroids, or other rounded granules, such as ovoids, etc. It relates more particularly to an improved process for making anion exchange agents by procedure which involves halomethylating pre-formed vinyl aromatic resins and reaction of the halomethylated resins with tertiary amines. The invention pertains especially to a method of halomethylating vinyl aromatic resins in the form of beads or spheroids so as to reduce or avoid crumbling, spalling, or shattering of the halomethylated resin beads or spheroids when reacted with a tertiary amine.

In general, synthetic anion exchange agents suitable for water-softening or other ion exchange operations may be obtained by reaction of a halomethylating agent such as chloromethyl methyl ether or bromomethyl methyl ether on the resinous copolymers of monovinyl- and polyvinyl aromatic compounds, e. g. the benzene-insoluble copolymers of styrene and divinylbenzene, of nuclear methylated styrene and divinylbenzene, or of styrene, ethylvinylbenzene and divinylbenzene, and thereafter reacting the halomethylated vinyl aromatic resins with ammonia or ammonia-type nitrogen containing compounds, e. g. a primary-, secondary- or tertiary amine.

The anion exchange agents in the form of beads or rounded granules permit ready and rapid flow of fluids through a bed of the same. However, I have observed that extensive crumbling, spalling or shattering of the vinyl aromatic resins frequently occurs when the halomethylated resins are reacted with ammonia or an amine. Crumbling or shattering of the resins is particularly pronounced when the vinyl aromatic resins are in the form of beads or spheroids and the halomethylated resin beads are reacted with a tertiary amine, i. e. to form the corresponding quaternary ammonium base, or a salt thereof. In this connection, it may be mentioned that the tendency toward crumbling or shattering of the resin beads or spheroids when reacted with a tertiary amine becomes more pronounced and extensive with increase in degree to which the resin has been halomethylated, i. e. with increase in the number of halomethyl groups introduced into the resin. Cracking and shattering are particularly pronounced in the instance in which the vinyl aromatic resin is in the form of beads or spheroids and is halomethylated to a degree such that after reaction with a tertiary amine the resin has an anion absorptive capacity corresponding to more than 20,000 grains of calcium carbonate per cubic foot of the bed of resin. Crumbling or shattering of the halomethylated resins upon reaction of the same with a tertiary amine, also occurs when the resin is in the form of granular or irregular shaped bodies, or particles, although the tendency toward shattering of the resin granules is not as extensive or pronounced as that which occurs when the resins are in bead or spheroidal form. Presumably, because of the difficulties just mentioned synthetic anion exchange agents of the class described which are strongly basic quaternary ammonium bases, or salts thereof, have not heretofore been produced in the form of stable beads, spheres, or spheroids.

I have now discovered that crumbling, spalling, or shattering, which beads or spheroids of vinyl aromatic resins undergo upon reaction of the halomethylated resins with a tertiary amine, can be rendered far less extensive, e. g. so as to amount merely to a slight spalling, or may be entirely avoided, by first treating or swelling the vinyl aromatic resins in the form of dry, or substantially dry, pre-formed beads, spheres, or spheroids, with a liquid acyclic polyhalo-hydrocarbon such as trichloroethylene, sym-tetrachloroethane, or perchloroethylene. The treatment may be accomplished by immersion in, or by soaking the resin beads or spheroids in the acyclic polyhalo-hydrocarbon, or by spraying. I have further found that the acyclic polyhalo-hydrocarbons containing from 2 to 3 carbon atoms and from 3 to 5 halogen atoms in the molecule are particularly effective in reducing or preventing crumbling or shattering of the resin beads or spheroids. Examples of suitable acyclic polyhalo-hydrocarbons are trichloroethylene, 1,1,2-trichloroethane, sym - tetrachloroethane, perchloroethylene, unsym-tetrachloroethane, pentachloroethane, 1,2,3 - trichloropropane, methylchloroform, 1,1,2-trichloropropane, tetrachloropropane, 1,1,2-trichloropropylene, 1,1,2,3-tetrachloropropane, 1,2,3,3-tetrachloropropylene, pentachloropropane, tribromoethylene and perbromoethylene. Mixtures of any two or more of the compounds may also be used.

The vinyl aromatic resins are halomethylated by reaction of a halomethylated agent such as chloromethyl methyl ether or bromomethyl methyl ether on the resin beads or spheroids while the resins are swollen by the acyclic polyhalo-hydrocarbon. Thereafter, the halomethylated resins are reacted with a tertiary-amine, to form vinyl aromatic resins containing the corresponding quaternary ammonium groups or radicals.

It is important that the vinyl aromatic resin in the form of beads or spheroids be treated or swelled with the acyclic polyhalo-hydrocarbon prior to, or during, halomethylation of the resin in order to reduce or avoid the occurrence of extensive crumbling or shattering of the resin beads or spheroids when the halomethylated resin is reacted with a tertiary amine. It is also important that the halomethylated resins contain a residual amount of the polyhalohydrocarbon dissolved therein when they are reacted with the tertiary amine in order to reduce the tendency toward the occurrence of shattering of the resin beads or spheroids. In this connection it may be mentioned that initial swelling of a vinyl aromatic resin with an acyclic polyhalo-hydrocarbon involves dissolving of the polyhalo-hydrocarbon in the resin. In general, the halomethylated vinyl aromatic resin beads or spheroids, after washing with water to remove excess halomethylating agent, or by-products of the reaction, e. g. methyl alcohol, retain a sufficient amount of the polyhalo-hydrocarbon dissolved therein to reduce or prevent shattering of the resin beads or spheroids when subsequently reacted with a tertiary amine. However, in the instance wherein the halomethylated resin is washed with a solvent for the polyhalo-hydrocarbon such as acetone or ethyl alcohol, which solvent may remove or extract the polyhalo-hydrocarbon from the resin beads, the halomethylated resin may advantageously be again treated with, or soaked in, a polyhalo-hydrocarbon prior to reaction of a tertiary amine therewith. The resin beads or spheroids usually retain a sufficient amount of the acyclic polyhalo-hydrocarbon dissolved therein to reduce or avoid extensive shattering, when the bulk volume of the halomethylated resin is 40 percent or more, greater than the bulk volume of the dry resin starting material.

The vinyl aromatic resins to be employed in the process are the benzene-insoluble copolymers of monovinyl aromatic compounds and polyvinyl aromatic compounds, which mono- and polyvinyl aromatic compounds are members of the benzene or naphthalene series, i. e. having not more than 10 carbon atoms in the aromatic nucleus. The monovinyl aromatic compounds may also contain in addition to the vinyl group, one or two lower alkyl radicals, each having from one to four carbon atoms, as nuclear substituents. Examples of such monovinyl aromatic compounds are styrene, ortho-methylstyrene, meta-methylstyrene, para-methylstyrene, meta-ethylstyrene, ortho-ethylstyrene, para-ethylstyrene, para-isopropylstyrene, ortho - para - dimethylstyrene, ar-diethylstyrene, ar-methyl-ar-isopropylstyrene, ar-sec.-butylstyrene, ar-ethyl-ar-isopropylstyrene, vinylnaphthalene and ar-methyl-vinylnaphthalene. Examples of polyvinyl aromatic compounds are divinylbenzene, divinyltoluene, divinylxylene, divinylethylbenzene, divinylnaphthalene, divinylmethyl-naphthalene and trivinylbenzene.

The vinyl aromatic resins are high polymers, e. g. having a molecular weight of 50,000 or more, and contain at least 80 percent by weight or more, of one or more of the monovinyl aromatic compounds chemically combined, or interpolymerized, with one or more polyvinyl aromatic compounds.

Methods of making the vinyl aromatic resins or copolymers in the form of beads or spheroidal bodies are well known. For instance, the vinyl aromatic resins may be obtained in the form of beads or spheroidal bodies by dispersing a mixture consisting of the monomers of a monovinyl aromatic compound and a polyvinyl compound such as those just mentioned in an aqueous medium and polymerizing the monomers by heating the same in the presence or absence of a polymerization catalyst such as benzoyl peroxide, tertiary-butyl peroxide, or di-tertiary-butyl peroxide, while the monomers are dispersed as droplets in the aqueous medium.

In practice of the invention, the dry or substantially dry vinyl aromatic resin in the form of beads, spheres or spheroids is swollen by, or dispersed in, an amount of an acyclic polyhalo-hydrocarbon corresponding to at least one part by weight of the polyhalo-hydrocarbon per part of the resin. The polyhalo-hydrocarbon is usually employed in amounts of from one to four parts by weight per part of the resin beads or spheroids, although greater amounts may be used.

Best results are usually obtained, both with regard to reducing the tendency toward crumbling or shattering of the resin beads or spheroids and also with ease of effecting the halomethylation reaction, when the acyclic polyhalo-hydrocarbon and the resin are employed in proportions relative to each other corresponding to from 0.5 to 4 parts by weight of the acyclic polyhalo-hydrocarbon per part of the halomethylating agent, e. g. chloromethyl methyl ether or bromomethyl methyl ether, and the combined weight of the acyclic polyhalo-hydrocarbon and the halomethylating agent corresponds to from 2 to 4 parts by weight per part of the resin.

Halomethylation of the resin, which occurs readily at temperatures of from $-10°$ to $120°$ C., is carried out by mixing bromomethyl methyl ether or chloromethyl methyl ether with the swollen resin beads or spheroids, together with a halomethylation catalyst, e. g. zinc chloride, zinc bromide, ferric chloride, stannic chloride, aluminum chloride, zinc oxide, or zinc, and maintaining the mixture at a reaction temperature within the range stated until the resin contains an average of at least 0.5, preferably from 0.8 to 1.2, halomethyl radicals per aromatic nucleus of the resin. The halomethylating agent is used in amount at least as great as that theoretically required to introduce the corresponding halomethyl radicals into the vinyl aromatic resin molecule. Usually an amount of the halomethylating agent of from 1 to 4 parts by weight per part of the vinyl aromatic resin is satisfactory. The halomethylation reaction is usually accompanied, at least to some extent by occurrence of a Friedel-Crafts side reaction, e. g. between halomethylated resin molecules and aromatic nuclei of the resin, which side reaction results in formation of methylene cross-linkages between aromatic radicals of the resin. Such cross-linking between the resin molecules tends to convert the halomethylated resin to a brittle product which may increase the tendency toward crumbling or shattering of the resin beads. The above-mentioned halomethylation catalysts differ from one another in their tendency to promote the Friedel-Crafts type of reaction. Zinc, zinc oxide and zinc halides appear to be less active as catalysts for the Friedel-Crafts reaction and are highly effective in causing the desired halomethylation reaction. A limited degree of cross-linking may be desired, but extensive cross-linking, sufficient to result in a highly brittle halomethylated product having increased tendency toward crumbling or shattering is undesirable. For these reasons metallic zinc or a zinc halide such as zinc chloride or zinc bromide is usually employed as the catalyst, although other halomethylation catalysts may be used. In some instances as little as one per cent of catalyst, based on the weight of the resin, is sufficient, but an amount of the catalyst of from 10 to 60 per cent by weight based on the weight of the resin is usually employed.

The halomethylated resin is separated from the reaction mixture and is washed with water. The resin may be washed with acetone or an alcohol such as methanol, ethanol, or isopropanol, or an aqueous solution of a mineral acid, e. g. with aqueous hydrochloric acid, to remove catalyst residue and unreacted halomethylating agent, together with by-products of the reaction, after which it is washed with water. However, washing with water alone is usually satisfactory and is preferred.

The halomethylated resin beads or spheroids, preferably in wet condition, i. e. after washing with water, are mixed with a tertiary amine, and the mixture heated to a reaction temperature such as to cause an appreciable rate of reaction with the amine and form a product in which a halogen atom of the halomethyl radical is replaced by a nitrogen atom of the tertiary amine, i. e. a vinyl aromatic resin containing the corresponding quaternary ammonium groups or radicals.

Any acyclic, carbocyclic or alicyclic tertiary amine containing a tervalent nitrogen atom having its valences attached only to carbon and which is free of substituent groups other than hydroxyl groups may be used in the process. The tervalent nitrogen atom may have attached thereto only alkyl radicals, or both an alkyl radical and an alkanol radical, as in trimethylamine or dimethylethanolamine. The amine reactant may contain two alkanol radicals and a single alkyl radical, e. g. methyldiisopropanolamine. Examples of suitable tertiary amines are trimethylamine, triethylamine, tributylamine, methyldiethanolamine, dimethylethanolamine, methylisopropanolamine, dimethylisopropanolamine, dimethylaniline, diethylaniline, dibutylethanolamine, dimethylethylamine, pyridine, N-dimethyl-3-amino-1,2-propane diol, and triamylamine.

The proportion of the tertiary amine, employed relative to the halomethylated resin reactant should be such that there is present in the reaction mixture at least one nitrogen atom of a tertiary amine, i. e. one molecular equivalent proportion of the tertiary amine, for each halomethyl radical in the resin. The tertiary amine may be used in excess over the minimum proportion just stated. Usually from one to five molecular proportions of a tertiary amine are used per halomethyl radical in the polymer, but greater proportions may be employed.

The reaction between the halomethylated resin beads or spheroids and the tertiary amine is usually carried out at atmospheric or superatmospheric pressure and at temperatures between 25° and 150° C., preferably from 25° to 100° C. The reaction may be carried out in the presence or absence of a dispersing medium. A large excess of the tertiary amine may be employed, in which case no other dispersing medium need be used. The reaction is preferably carried out in the presence of a dispersing medium which is a solvent for the tertiary amine such as water, acetone, or ethanol. When employing water soluble tertiary amines, e. g. dimethylethanolamine or methyldiisopropanolamine, which are not readily vaporized at a reaction temperature of 100° C., or below, it is preferred to carry out the reaction in aqueous medium employing the amine in concentration of 20 per cent by weight or more, based on the combined weight of the same and the water, by heating the mixture to a reflux temperature. The reaction is usually complete in from 2 to 6 hours at temperatures between 80° and 100° C.

The aminated, or the quaternized, resin beads or spheroids are separated from the reaction mixture and washed with water or with an aqueous mineral acid solution, e. g. aqueous hydrochloric acid. The resin beads or spheroids may be washed with an organic solvent such as acetone, ethanol, or isopropanol, to extract unreacted tertiary amine from the resin, after which it is washed with water or an aqueous mineral acid solution. The aminated resin may be converted to its basic or hydroxide form by washing with an aqueous solution of an alkali, e. g. an aqueous solution of sodium hydroxide or potassium hydroxide.

The following examples illustrate ways in which the principle of the invention has been applied but are not to be construed as limiting its scope.

EXAMPLE 1

A charge of 10 grams of a benzene-insoluble copolymer of 6 per cent by weight of divinylbenzene, 9 per cent of ethylvinylbenzene and 85 per cent of styrene in the form of beads passing through a 20 mesh per inch standard Tyler screen and retained on an 80 mesh screen, was placed in a glass reaction flask equipped with a reflux condenser and stirrer. The resin beads were mixed with 10 grams of perchloroethylene and the mixture was stirred over a period of 30 minutes. Thereafter, 20 grams of chloromethyl methyl ether was added to the mixture and stirring continued over a period of about 15 minutes. Five grams of zinc chloride were then added as catalyst and the mixture heated to a temperature between 50° and 55° C. over a period of 4 hours. The reaction mixture was then mixed with 250 cc. of water. The halomethylated resin beads were separated by filtering the mixture and were washed with water.

A charge of 5 cc. of the halomethylated resin beads was mixed with 25 cc. of an aqueous solution containing 67 per cent by weight of dimethylethanolamine. The mixture was heated to a reflux temperature over a period of 4 hours. The mixture was cooled and the resin beads separated by filtering and were washed with water. The resin beads were dried and were tested for broken beads and also examined under the microscope. The procedure used to determine the proportion, or per cent, of broken beads was to place a measured volume, e. g. 5 cc., of the dried aminated resin beads on the clean surface of a metal plate having the dimensions 10 inches x 10 inches, which plate was inclined at an angle of about 6 degrees to the horizontal axis and was gently vibrated. The resin beads rolling off of the lower edge of the plate were collected and their volume measured. The volume of the beads rolling off of the plate was calculated as the per cent of beads in the aminated resin. The aminated resin was 90.3 per cent beads and had an anion exchange capacity corresponding to 26,500 grains of calcium carbonate per cubic foot of a wet resin bed.

A charge of 10 grams of the copolymer beads was halomethylated with 30 grams of chloromethyl methyl ether alone, under time and temperature conditions similar to those just mentioned. Ten cubic centimeters of the halomethylated resin beads were mixed with 60 cc. of an aqueous 57 weight per cent solution of dimethylethanolamine and the mixture heated to a temperature of 50°–55° C. over a period of 4 hours. The resin was separated and washed with water. The aminated resin had a capacity equivalent to 28,000 grains of calcium carbonate per cubic foot of a wet resin bed. Nearly all of the resin beads were broken.

EXAMPLE 2

In each of a series of separate experiments, a charge of 10 grams of a benzene-insoluble copolymer of 6 per cent by weight of divinylbenzene, 9 per cent of ethylvinylbenzene and 85 per cent of styrene in the form of beads passing through a 20 mesh per inch and retained on an 80 mesh Tyler screen, was halomethylated by reaction of 20 grams of chloromethyl methyl ether on the resin beads in the presence of 5 grams of zinc chloride as catalyst and 20 grams of an acyclic polyhalohydrocarbon as stated in the table, by procedure similar to that described in Example 1. The halomethylated resin beads from each of the experiments were mixed with an excess, i. e. from 30 to 50 cc., of an aqueous solution containing 47 per cent by weight of dimethylethanolamine and the mixture heated to a reflux temperature over a period of 4 hours. The aminated resin was separated by filtering the mixture and was washed with water. The product from each of the experiments was tested for anion exchanger capacity and per cent beads. Table I names the acyclic polyhalo-hydrocarbon employed as swelling or conditioning agent and states the equivalent anion exchange capacity of the resin in grains of calcium carbonate per cubic foot of a wet resin bed and gives the approximate per cent of beads in the aminated resin. For purpose of comparison, the table also gives the results obtained with polyhalohydrocarbons which are outside the scope of the invention.

*Table I*

| Run No. | Polyhalohydrocarbon | Capacity Grains CaCO₃/cu.ft. | Percent Beads |
| --- | --- | --- | --- |
| 1 | Trichloroethylene | 27,500 | 96.6 |
| 2 | sym-Tetrachloroethane | 28,500 | 98.9 |
| 3 | 1,1,1-Trichloroethane | 25,400 | 99.5 |
| 4 | Pentachloroethane | 28,000 | 85.5 |
| 5 | 1,1,2-Trichloroethane | 27,700 | 99.5 |
| 6 | Chloroform | 24,000 | 0 |
| 7 | Ethylene dichloride | 29,000 | 11.1 |

EXAMPLE 3

In each of a series of experiments 55 grams of a copolymer of 6 per cent by weight of divinylbenzene, 9 per cent of ethylvinylbenzene and 85 per cent of styrene, in the form of beads or spheroidal bodies passing through a 20 mesh per inch standard Tyler screen and retained on an 80 mesh screen were placed in a reaction flask equipped with a reflux condenser and stirrer. An amount of perchloroethylene, as stated in the following table, was added to the resin beads and the mixture stirred at room temperature over a period of about 30 minutes to swell the resin beads. Chloromethyl methyl ether was added to the mixture in amount as stated in the table, together with 27.5 grams of zinc chloride as halomethylation catalyst. The resulting mixture was heated to a temperature between 50° and 55° C., over a period of time which ranged from 16 hours to 23.5 hours in the series of experiments, to halomethylate the resin beads or spheroids. Thereafter, from 200–300 cc. of water was added to the mixture. The halomethylated resin beads were separated by filtering the mixture and were washed with water.

The washed halomethylated resin beads from each of the experiments was aminated by dispersing 5 cc. of the resin beads in 30 cc. of an aqueous solution consisting of 67 per cent by weight of dimethylethanolamine and heating the mixture to a reflux temperature over a period of 4 hours. The mixture was cooled and the aminated resin beads were separated by filtering and were washed with water. A portion of the aminated resin beads from each of the experiments was tested for anion exchange capacity. The remaining portion of the aminated resin beads from each of the experiments was dried and examined under a microscope for cracking or shattering of the beads and was also tested for broken beads. The procedure used to determine the proportion of broken beads was to place a measured volume, e. g. 20 cc., of the dry aminated resin beads on a clean plane surface of a metal plate having the dimensions 10 inches x 10 inches and inclined at an angle of about 6 degrees to the horizontal axis, which plate was gently vibrated. The resin beads rolling off of the lower edge of the plate were collected and their volume measured. The volume of the beads rolling from the plate was reported as per cent beads or spheres in the aminated resin. Table II states the parts by weight of perchloroethylene and the parts of chloromethyl methyl ether used in each of the experiments, together with the ratio or proportion of perchloroethylene in parts by weight per part of the chloromethyl methyl ether used. The table also gives the time and temperature conditions for which the halomethylation reaction was carried out, states the anion exchange capacity of the aminated resins expressed as grains of calcium carbonate per cubic foot of a wet resin bed and gives the per cent of beads or spheres in the aminated resin.

*Table II*

| Run No. | Parts Perchloroethylene | Parts chloromethyl methyl ether | Ratio | Time, Hrs. | Temp., °C. | Capacity grains CaCO₃/cu.ft. | Percent Beads |
| --- | --- | --- | --- | --- | --- | --- | --- |
| 1 | 27.5 | 83 | 0.33 | 23 | 50–55 | 23,600 | 37.1 |
| 2 | 55 | 83 | .67 | 19.5 | 50–55 | 28,500 | 92.3 |
| 3 | 55 | 55 | 1.0 | 23.5 | 50–55 | 20,700 | 91.5 |
| 4 | 108 | 55 | 2.0 | 16 | 50–55 | 20,000 | 98.4 |
| 5 | 220 | 55 | 4.0 | 22 | 50–55 | 22,500 | 86.2 |

EXAMPLE 4

A number of separate experiments were carried out employing a benzene-insoluble vinyl aromatic resin having a composition and physical form similar to that described in Example 3. Table III states the relative proportions in parts by weight of the vinyl aromatic resin beads, the perchloroethylene, the chloromethyl methyl ether and the zinc chloride employed, together with the ratio of perchloroethylene to chloromethyl methyl ether and the time and temperature conditions for which the halomethylation reaction of each experiment was carried out. The halomethylated resin from each experiment was reacted with dimethylethanolamine and the aminated product analyzed for ion exchange capacity and per cent of beads or spheres as described in the preceding example. The table also gives the anion exchange capacity of the aminated resin obtained in each of the experiments and the per cent of beads.

*Table III*

| Run No. | Parts Resin Beads | Parts perchloro-ethylene | Parts chloro-methyl methyl ether | Parts ZnCl₂ | Ratio | Time, Hrs. | Temp., °C. | Capacity grains CaCO₃/cu. ft. | Percent Beads |
|---|---|---|---|---|---|---|---|---|---|
| 1 | 10 | 0 | 30 | 5 | ------- | 4 | 50-55 | 29,700 | 26.1 |
| 2 | 55 | 55 | 83 | 27.5 | 0.67 | 5 | 50-55 | 26,000 | 93.6 |
| 3 | 10 | 20 | 20 | 5 | 1 | 4 | 50-55 | 27,000 | 89.2 |
| 4 | 10 | 40 | 10 | 5 | 4 | 4 | 50-55 | 14,000 | 98.7 |

Although the aminated resin in the above run 4 was nearly all in the form of beads or spheroidal bodies, the anion exchange capacity was low. Such products are not as desirable for ion exchange operations as the aminated resin beads of higher capacity. In general, the anion exchange capacity of the aminated resin is lowered to a serious extent when the ratio of the alicyclic polyhalo-hydrocarbon swelling agent to the halomethylating agent is substantially greater than 4:1, based on the weight of said agents.

EXAMPLE 5

A charge of 10 grams of a benzene-insoluble copolymer of 4 per cent by weight of divinylbenzene, 6 per cent of ethylvinylbenzene and 90 per cent of styrene, in the form of beads or spheroidal bodies passing through a 20 mesh per inch and retained on an 80 mesh Tyler screen, was placed in a reaction flask equipped with a reflux condenser and stirrer. Twenty grams of perchloroethylene was added to the resin beads and the mixture stirred over a period of 30 minutes. Twenty grams of chloromethyl methyl ether was added and after stirring for an additional 15 minutes, 5 grams of zinc chloride was added to the mixture as halomethylation catalyst. The mixture was heated to a temperature of 50°-55° C. over a period of 4 hours. Thereafter, 300 cc. of water was added to the mixture. The halomethylated resin beads were separated by filtering the mixture and were washed with wtaer. A charge of 4 cc. of the washed halomethylated resin beads was mixed with 30 cc. of an aqueous solution consisting of 55 per cent by weight of dimethylethanolamine and 45 per cent water. The mixture was heated to a temperature of 92° C. over a period of 2 hours, then cooled. The aminated resin was separated by filtering and was washed with water. The aminated resin beads were tested for anion exchange capacity and per cent of beads as in Example 1. The aminated resin was 99.9 per cent in bead or spheroidal form and had a capacity equivalent to 22,000 grains of calcium carbonate per cubic foot of a wet resin bed.

The experiment was repeated, except that the halomethylated resin beads were reacted with trimethylamine. Six cubic centimeters of the halomethylated resin beads were mixed with 100 cc. of an aqueous solution containing 25 weight per cent of trimethylamine. The mixture was heated to a temperature of 70° C. for about one hour. Thereafter, an additional 100 cc. of the aqueous trimethylamine solution was added to the mixture and heating continued for another hour. The aminated resin beads were separated by filtering and were washed with water. The aminated resin was 98.9 per cent beads and had an anion exchange capacity equivalent to 25,200 grains of calcium carbonate per cubic foot of a wet resin bed.

Other modes of applying the principle of the invention may be employed instead of those explained, change being made as regards the method or compounds herein disclosed, provided the steps or compounds stated by any of the following claims or the equivalent of such stated steps or compounds be employed.

I claim:

1. A method of making a synthetic anion exchange agent which comprises treating a benzene-insoluble copolymer of at least 80 per cent by weight of a monovinyl aromatic hydrocarbon and not more than 20 per cent of a polyvinyl aromatic hydrocarbon in the form of solid spheroidal bodies with an acyclic polyhalohydrocarbon containing from 2 to 3 carbon atoms and from 3 to 5 halogen atoms selected from the group consisting of chlorine and bromine in the molecule, reacting the copolymer with at least 0.5 molecular proportion of a halomethylating agent selected from the group consisting of chloromethyl methyl ether and bromomethyl methyl ether, per aromatic nucleus in the copolymer while the copolymer is in contact with, and swollen by, the acyclic polyhalo-hydrocarbon, the amounts of the polyhalo-hydrocarbon and the halomethylating agent relative to each other in the starting reaction mixture being within the range of from 0.5 to 4 parts by weight of the polyhalo-hydrocarbon per part of the halomethylating agent, and thereafter reacting the halomethylated copolymer with a tertiary amine in amounts such that there is present in the reaction mixture at least one molecular proportion of the tertiary amine for each halomethyl radical in the copolymer, while the halomethylated copolymer beads remain swollen by the acyclic polyhalo-hydrocarbon.

2. A method of making a synthetic anion exchange agent which comprises treating a benzene-insoluble copolymer of at least 80 per cent by weight of a monovinyl aromatic hydrocarbon and not more than 20 per cent of a polyvinyl aromatic hydrocarbon in the form of solid spheroidal bodies with an acyclic polyhalo-hydrocarbon containing from 2 to 3 carbon atoms and from 3 to 5 halogen atoms selected from the group consisting of chlorine and bromine in the molecule, reacting the copolymer with from 0.8 to 1.2 molecular proportions of a halomethylating agent selected from the group consisting of chloromethyl methyl ether and bromomethyl methyl ether, per aromatic nucleus in the copolymer while the copolymer is in contact with, and swollen by, the acyclic polyhalo-hydrocarbon, the amounts of the polyhalo-hydrocarbon and the halomethylating agent relative to each other in the starting reaction mixture being within the range of from 0.5 to 4 parts by weight of the polyhalo-hydrocarbon per part of the halomethylating agent, and thereafter reacting the halomethylated copolymer beads with a tertiary amine in amounts such that there is present in the reaction mixture at least one molecular proportion of the tertiary amine for each halomethyl radical in the copolymer while the halomethylated copolymer beads remain swollen by the acyclic polyhalo-hydrocarbon.

3. A method of making a synthetic anion exchange agent as claimed in claim 2 wherein the acyclic polyhalo-hydrocarbon is perchloroethylene.

4. A method of making a synthetic anion exchange agent as claimed in claim 2 wherein, the acylic polyhalo-hydrocarbon is trichloroethylene.

5. A method of making a synthetic anion exchange agent as claimed in claim 2 wherein, the acyclic polyhalo-hydrocarbon is 1,1,1-trichloroethane.

6. A method of making a synthetic anion exchange agent as claimed in claim 2 wherein, the acyclic polyhalo-hydrocarbon is 1,2,3-trichloropropane.

7. A method of making an anion exchange agent as claimed in claim 2 wherein, the acyclic polyhalo-hydrocarbon is pentachloroethane.

8. The process of preparing a quaternary ammonium anion-exchange resin in the form of solid spheroidal bodies, which comprises chloromethylating spheroidal particles of a benzene-insoluble copolymer of a major proportion of a monovinyl aromatic hydrocarbon with not more than 20 per cent of a divinyl aromatic hydrocarbon in the presence of perchloroethylene which swells said copolymer particles, and then aminating, with a water-soluble tertiary amine and in an aqueous medium, the chloromethylated particles of copolymer while they are wet with and swollen by said perchloroethylene.

ELMER L. McMASTER.

REFERENCES CITED

The following references are of record in the file of this patent:

UNITED STATES PATENTS

| Number | Name | Date |
|---|---|---|
| 2,466,675 | Bauman | Apr. 12, 1949 |
| 2,500,149 | Boyer | Mar. 14, 1950 |